US012305559B2

(12) United States Patent
Lindsley

(10) Patent No.: US 12,305,559 B2
(45) Date of Patent: May 20, 2025

(54) CATALYTIC CONVERTER LOCKING DEVICE AND ASSEMBLY

(71) Applicant: VSI, LLC, Green Bay, WI (US)

(72) Inventor: Jason W. Lindsley, De Pere, WI (US)

(73) Assignee: VSI, LLC, Green Bay, WI (US)

( * ) Notice: Subject to any disclaimer, the term of this patent is extended or adjusted under 35 U.S.C. 154(b) by 0 days.

(21) Appl. No.: 18/913,427

(22) Filed: Oct. 11, 2024

(65) Prior Publication Data
US 2025/0035026 A1     Jan. 30, 2025

Related U.S. Application Data

(60) Provisional application No. 63/548,041, filed on Nov. 10, 2023.

(51) Int. Cl.
*F01N 3/28*     (2006.01)
*F16B 41/00*   (2006.01)

(52) U.S. Cl.
CPC .......... *F01N 3/2803* (2013.01); *F16B 41/005* (2013.01)

(58) Field of Classification Search
CPC ............................. F01N 3/2803; F16B 41/005
See application file for complete search history.

(56) References Cited

U.S. PATENT DOCUMENTS

| | | | | |
|---|---|---|---|---|
| 8,002,232 B2 * | 8/2011 | Meislahn | ............ | E05B 73/0005 248/58 |
| 8,453,784 B2 * | 6/2013 | Dusa, II | ............ | F01N 13/1822 248/551 |
| 9,963,915 B1 * | 5/2018 | Earle | .................... | E05B 73/0005 |
| D879,008 S * | 3/2020 | Pringle | ........................ | D12/223 |
| 11,708,783 B1 * | 7/2023 | Corkery | .............. | F01N 13/1888 248/551 |
| 11,713,706 B2 * | 8/2023 | Todd | ........................ | B60R 25/00 285/119 |
| 2009/0107752 A1 * | 4/2009 | Dusa, II | ................... | F01N 13/18 180/287 |
| 2010/0140420 A1 * | 6/2010 | Deichman | ................. | F16L 3/11 248/58 |
| 2011/0036130 A1 * | 2/2011 | Hisler | ........................ | F01N 3/28 70/57.1 |
| 2013/0300550 A1 * | 11/2013 | Potter | ...................... | B60R 25/20 340/429 |
| 2014/0104048 A1 * | 4/2014 | De Kock | ........... | G08B 13/1654 340/429 |
| 2017/0248489 A1 * | 8/2017 | Gibson | ...................... | F16B 1/00 |
| 2023/0406263 A1 * | 12/2023 | Richardi | ............. | B60R 25/1004 |

* cited by examiner

*Primary Examiner* — Mark A Williams
(74) *Attorney, Agent, or Firm* — Amundsen Davis LLLC

(57) ABSTRACT

The present invention comprises a number of layered stainless steel plates, a plurality of bolts and tamper-resistant screws, and a length of cable. A temporary bolt head holder can be included to keep the bolt heads in place. The plates can be held apart by a plurality of springs temporarily placed between the plates. The cable is then wrapped around the catalytic converter and threaded between openings between the plates. After this, the bolt holder can be removed. When the bolts are tightened, they create a "clamping" force that securely holds the cable in place. A protective cover is then placed over the catalytic converter and secured to the other plates and cable using tamper-resistant screws. The cable is also wrapped around other underbody structure of the vehicle to further compound the amount of anti-theft security that is provided by the lock and assembly of the present invention.

6 Claims, 5 Drawing Sheets

CATALYTIC CONVERTER LOCKING DEVICE AND ASSEMBLY

This application claims priority to U.S. Provisional Patent Application No. 63/548,041 filed Nov. 10, 2023.

FIELD OF THE INVENTION

The present invention relates generally to catalytic converters used in the exhaust systems of gas-powered vehicles. The present invention also relates generally to locks and to other security devices that use locks and locking devices. More specifically, it relates to a catalytic converter locking device and assembly, particularly of a type that uses an "overwrap" structure and a length of braided metal cable to secure the catalytic converter and deter tampering with and/or theft of the catalytic converter.

BACKGROUND OF THE INVENTION

Catalytic converters have long been used in the United States and throughout the world. Focus on the use of catalytic converters has been stoked more recently by two factors. The first factor is that the United States and other countries have committed themselves to reaching certain climate change goals, with one of those goals being an effort to make gas engines "greener". The second factor is the realization that catalytic converters are expensive to make and are becoming increasingly more expensive to make due to current demands for the precious metals used in the catalytic converters.

As to the first factor referenced above, the catalytic converter plays an important part in the exhaust and emissions systems of gas-powered vehicles. Without a catalytic converter, such vehicles produce far more carbon monoxide thereby creating smog in highly populated urban areas and elsewhere. With a catalytic converter, the catalytic converter is instrumental in "converting" carbon monoxide to carbon dioxide and water, the latter being the liquid that can be seen dripping from an exhaust pipe when the gas engine is in operation. This is the chemical reaction that occurs within the catalytic converter. To change the state of certain gas engine emissions, various precious metals are used. One of the precious metals that makes up a catalytic converter is platinum. Platinum is used as a "catalyst" in the chemical reaction but is not used up in that chemical reaction. This is important because, if the platinum was used up in the process, the platinum in the catalytic converter would need to be replenished. It is also necessary that the catalytic converter contain either palladium or rhodium to perform this chemical reaction.

Platinum is an expensive precious metal. It is extremely dense, even denser than gold. Palladium is likewise an expensive precious metal. Palladium has a per ounce value that is higher than both gold and platinum. Its price is dictated by market conditions and the fact that it is a rare metal—essentially a by—product of mining platinum and nickel. Rhodium is another precious metal that plays a part in the catalytic converter. It oxidizes nitrogen so that it becomes nitrogen and oxygen. Each of these precious metals has become even more expensive due to the closure of mines in view of the recent global pandemic. That is, the supply of each of these precious metals has unexpectedly decreased while the demand continues to increase.

Realizing the near historic rise in market prices for platinum, palladium and rhodium, some people have taken to stealing catalytic converters from gas-powered vehicles. Such individuals believe that they can extract the precious metals from the converter and sell them on the black market. The "tools of choice" for such individuals include a chain pipe cutter, which is small, lightweight and very quiet. Another is a bolt cutter, which is likewise small, lightweight and quiet. Still another is a reciprocating saw which is effective for pipe cutting but is also very loud and would be likely to draw attention when used in a crowded area. Still another tool is a handheld grinder, which is probably the most effective cutting tool but it too is loud when used and sends highly visible sparks flying during the cutting process, day or night, thereby drawing attention to the thief's activities by both sound and sight. Obviously, this activity and the use of such tools in this way is morally and legally wrong. However, it also increases the demand for catalytic converters at a time when supply cannot meet the demand, together with an overall increase in the price for catalytic converters.

SUMMARY OF THE INVENTION

In the view of these inventors, there is a need to provide an effective, low-cost, and easily installed deterrent to the removal of a catalytic converter from any gas-powered vehicle irrespective of the tool of choice that is used. The structure of the present invention generally comprises a number of layered stainless steel plates, a plurality of bolts, a plurality of tamper-resistant screws, and a length of braided metal cable. To assist with installation of the plates and bolts in the field, a temporary bolt head holder (also referred to herein as the "bolt holder" or "a removable alignment structure") can be included to keep the bolt heads in place. The plates can be held apart by a plurality of springs temporarily placed between the plates. The cable is then wrapped around the catalytic converter and directed between openings between the plates. After this, and if used, the bolt holder can be removed together with the tamper-resistant screws. With the bolt holder removed, the bolts are tightened thereby creating a "clamping" force that securely holds the cable in place even if only one portion of the cable has been cut. Multiple cuttings must occur, which increases the time it takes to fully remove the catalytic converter locking device of the present invention. Further, the cable is effectively "anchored" in place by allowing it to wrap around other underbody structure of the vehicle to further compound the amount of anti-theft security that is provided by the lock and assembly of the present invention. Lastly, the tamper-resistant screws are used to anchor a top plate which further impedes quick access to the catalytic converter and the other structure attached to it using the device of the present invention.

The foregoing and other features of the device and assembly of the present invention will be apparent from the detailed description that follows.

DETAILED DESCRIPTION OF THE INVENTION

Figure 1:
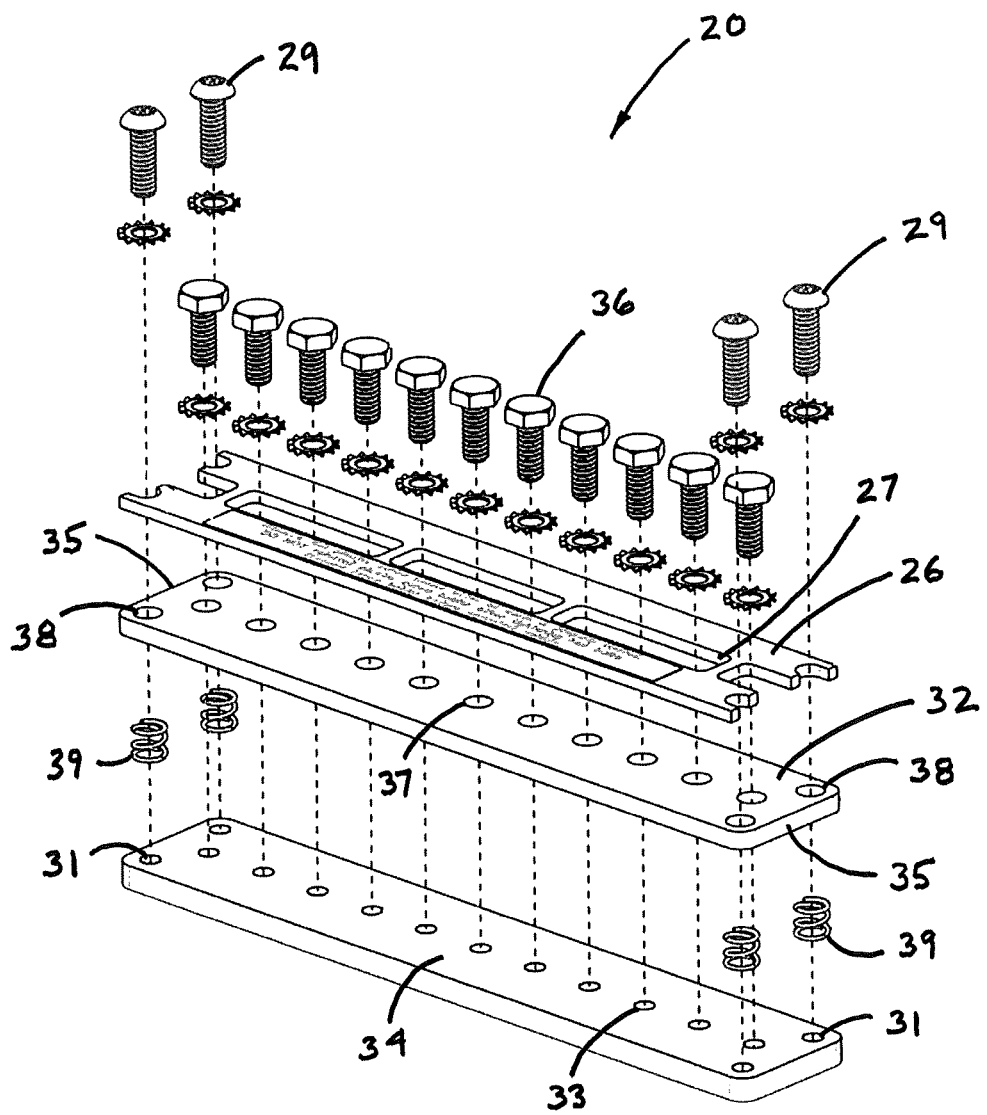
FIG. 1 is an exploded perspective view of a portion of the catalytic converter locking device constructed in accordance with the present invention.
Figure 2:
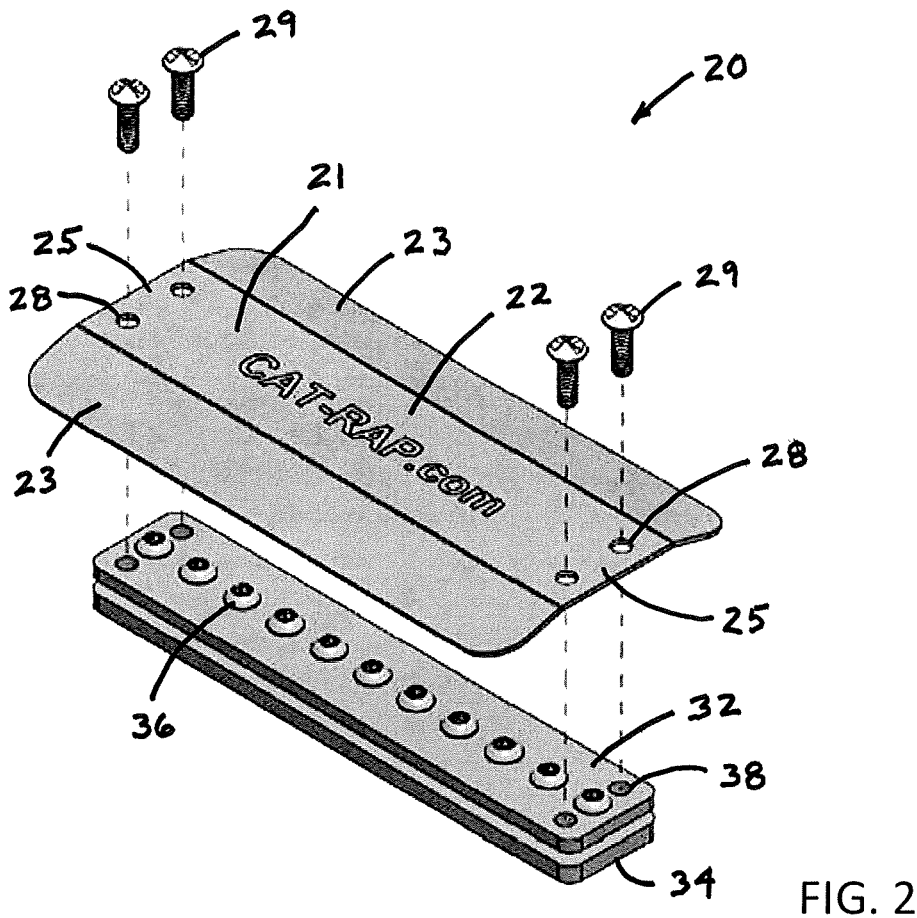
FIG. 2 is another exploded perspective view of a portion of a catalytic converter locking device constructed in accordance with the present invention.
Figure 3:
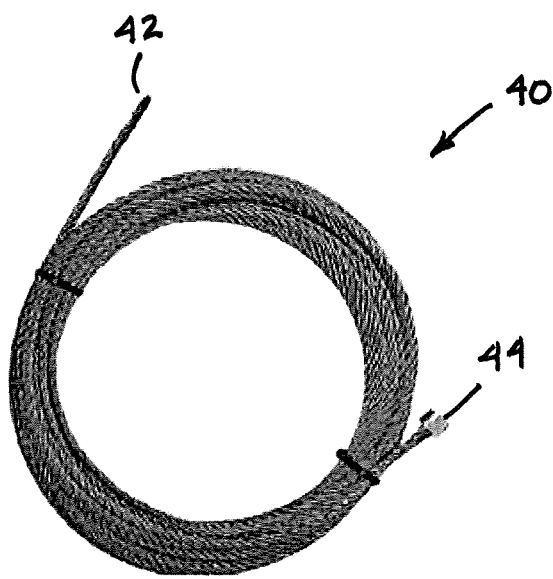
FIG. 3 is a perspective view of a looped length of cable that is another portion of the catalytic converter locking device constructed in accordance with the present invention.
Figure 6:
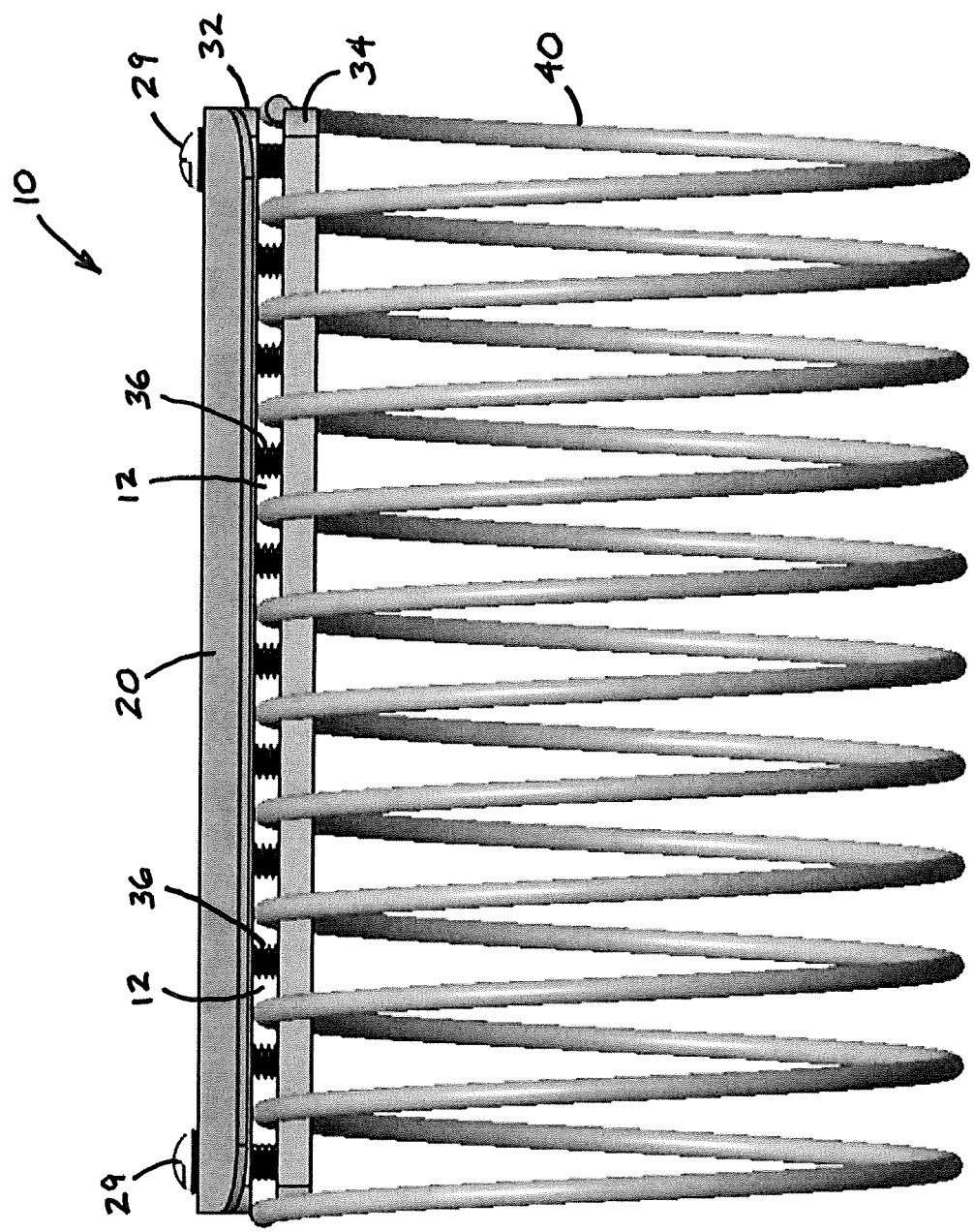
FIG. 6 is a side and slightly enlarged view of the catalytic converter locking device showing portions of the cable clamped between the top and bottom plates of the device.

Referring now to the drawings in detail, FIG. 6 is a side elevation view of the catalytic converter locking device, generally identified 10. As shown, the device 10 comprises two essential elements. The first element is a locking structure, generally identified 20. See also FIGS. 1 and 2. The second element is at least one braided metal cable, generally identified 40. The locking structure 20 and metal cable 40 are preferably made of stainless steel with the cable 40 being braided. The braided cable 40 has a furled end 44 and an unfurled end 42. See FIG. 2. The furled end 44 can be used in one of two ways. It can be used to anchor the cable 40 or it can be used to help the user during installation by keeping the braided metal cable 40 from unbraiding which would create a frayed end, making it difficult to install. This could also comprise an encased end with some sort of covering to prevent unbraiding of the cable end 44, which would be difficult to work with.

Figure 4:
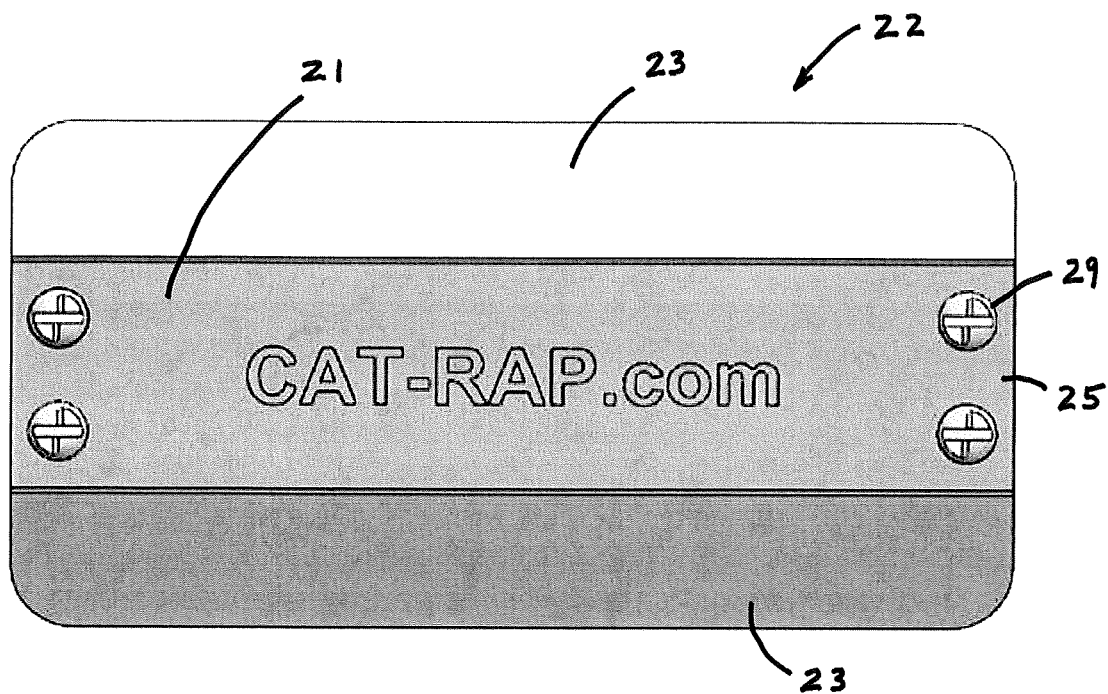
FIG. 4 is a top plan view of that portion of the catalytic converter locking device shown in FIG. 2 and further showing the top plate thereof.
Figure 5:
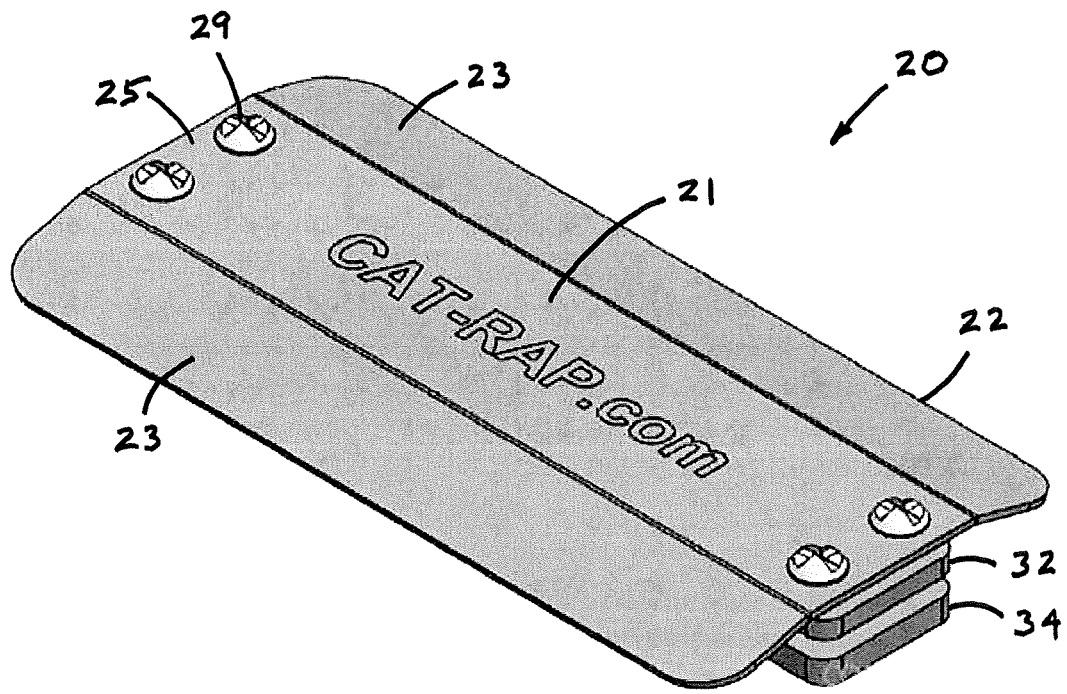
FIG. 5 is a perspective view of that portion of the catalytic converter locking device shown in FIGS. 2 and 4 and further showing the top and bottom plates attached to one another.

Returning to FIGS. 1 and 2, they show perspective views further detailing the elements of the locking structure 20. The locking structure 20 comprises a protective top plate 22 having an underside 24. The top plate 22 has a substantially flat center portion 21, opposing longitudinally and slightly downwardly extending sides 23 and opposing ends 25. This construction makes the top plate 22 bidirectional for ease in installation of the device 10. Each end 25 has a plurality of holes 28, each hole 28 being configured to receive the threaded portion of a tamper-resistant screw 29 within it. The holes 28 are not threaded. They are "pass through" holes intended for proper positioning of the elements of the device 10. See also FIGS. 4 and 5. The top plate 22 is preferably fabricated from stainless steel.

A first bottom plate 32 is provided and is intended to be disposed below the center portion 21 of the top plate 22. The first bottom plate 32 includes opposing ends 35, a plurality of holes 38 disposed within each end 35 and a line of additional holes 37 are provided for receiving the threaded end of a bolt 36 although the holes 37 are not threaded. They too are pass-through holes 37. A second bottom plate 34 is also provided. See FIG. 1. It is almost identical to the first bottom plate 32 but includes a plurality of threaded holes 31, 33 that match the alignment and threads of the screws 29 and the bolts 36, respectively.

As shown in FIG. 6, a portion of the cable 40 is "captured" between the bolts 36, the first bottom plate 32 and the second bottom plate 34 when the locking device 10 is used as intended. Referring again to FIG. 1, it shows an alignment structure 26 having openings 27 in it for holding the hex-head bolts 36 in place by not allowing them to rotate as the cable 40 is threaded between the first and second bottom plates 32, 34, respectively, during installation. A plurality of springs 39 help to hold the plates 32, 34 apart which in turn provides pressure to hold the alignment structure 26 in place when the cable 40 is pulled through. The alignment structure 26 is removed after the cable 40 has been wrapped and the bolts 36 (with or without lock washers) are tightened to complete the installation.

Figure 7:
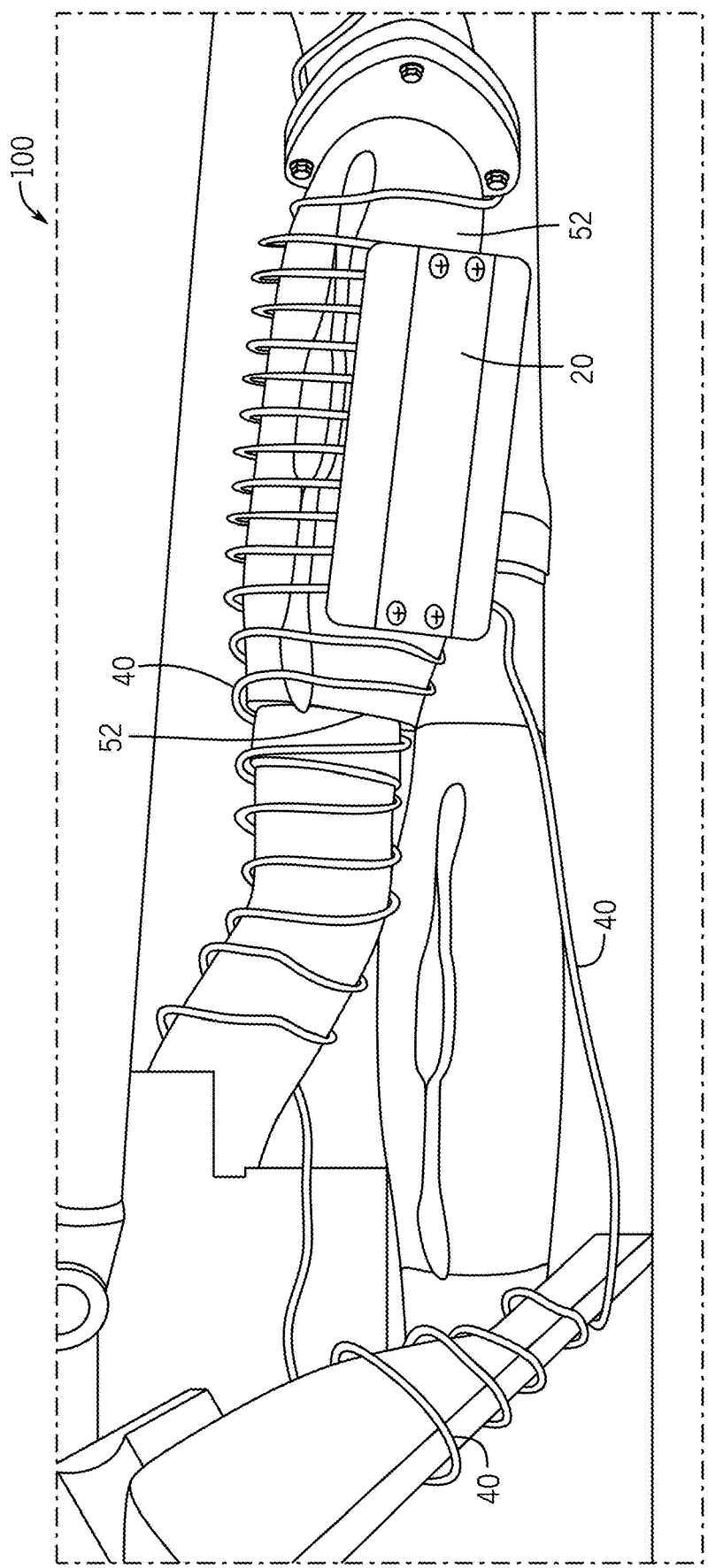
FIG. 7 is an image showing the catalytic converter locking device as secured to the catalytic converter of a vehicle.

FIG. 7 illustrates how the locking device 10 is used with a catalytic converter 52 that is disposed on the underside of a gas-powered motor vehicle. The locking device 10, when used with a catalytic converter 52 is an assembly, generally identified 100.

In application, the cable 40 is wrapped around the catalytic converter 52 in such a way that multiple portions of the cable 40 are "fed through" and pass between the first bottom plate 32 and the second bottom plate 34 of the locking device 10, the plates 32, 34 being loosely connected such that the cable 40 can be fed through the openings 12. See FIG. 6. This is accomplished by inserting the unfurled end 42 of the cable 40 through one of the openings 12, preferably toward the middle of the locking structure 20. The cable 40 is pulled through the opening 12 until the furled end 44 of the cable 40 prevents further passage of the cable 40 through the opening 12. With the furled end 44 of the cable 40 secured, the remainder of the cable 40 can be passed through other openings 12 until the cable 40 is tightly wrapped around the catalytic converter 52 and around other portions of the vehicle frame. See FIG. 7. The screws 29 can then be backed out such that the alignment structure 26 and springs 39 can be removed. The screws 29 are then reinserted. The top plate 22 can then be tightened to the second bottom plate 34 thereby capturing each portion of the cable 40 disposed therebetween and within each opening 12 by use of the tamper-resistant screws 29 referenced earlier. Towards the end of using up the full length of the cable 40, there should be a sufficient length of the cable 40 at the unfurled end 42 such that the unfurled end 42 can be captured within an opening 12. This creates secure, individual loops of cable 40 around the catalytic converter 52 and other portions of the vehicle frame. It is to be further noted noted that the longitudinally and slightly downwardly extending sides 23 of the top plate 22 further deny access to the wrapped cable 40 and serve as an additional deterrent to any attempt to remove the locking device 10 by cutting through the cable 40 when the cable 40 is wrapped about the catalytic converter 52. Accordingly, and instead of cutting one portion of the cable 40 and releasing all portions of the cable 40 from the locking device 10 at once, each portion of the cable 40 requires cutting. Further, and as is shown in FIG. 7, the length of the cable 40 is such that other portions of it can be intertwined with and wrapped around other undercarriage frame portions of the motor vehicle. This provides additional deterrence to any attempted theft of the catalytic converter 52. The wrapping of the cable 40 in this fashion is a deterrent because it slows any attempt to cut the catalytic converter 52 away from the locking device 10 and to remove the catalytic converter 52 from the vehicle (by any of the means referenced at the outset).

Additional advantages and modifications will readily occur to those skilled in the art. Therefore, the invention in its broader aspects is not limited to the specific details disclosed and described herein. Accordingly, various modifications may be made without departing from the spirit or scope of the general inventive concept disclosed herein.

I claim:

1. A catalytic converter locking device for use with a catalytic converter, the catalytic converter disposed on the underside of a motor vehicle, the underside of the motor vehicle further comprising other vehicle frame portions, the catalytic converter locking device comprising:

a first bottom plate comprising a longitudinally extending structure having a plurality of pass-through holes;

a second bottom plate comprising a longitudinally extending structure having a plurality of threaded holes, the pass-through holes of the first bottom plate being configured to be aligned with the plurality of threaded holes of the second bottom plate;

a plurality of threaded fasteners configured for securement of the first bottom plate to the second bottom plate via the holes defined therein;

a top plate configured to be disposed over the first and second bottom plates;

at least one metal cable having a length;

wherein a plurality of openings is defined between the bottom plates and the fasteners extending between the plates;

wherein the cable is configured to be passed through the plurality of defined openings and wrapped around the catalytic converter;

wherein tightening of the fasteners clamps the metal cable between the first and second plates and around the catalytic converter;

a plurality of tamper-resistant fasteners; and wherein the top plate comprises a tamper-resistant structure that is configured to be fastened to the bottom plates via the plurality of tamper-resistant fasteners.

2. The catalytic converter locking device of claim 1 wherein the cable is further configured to wrap around the catalytic converter and at least one of the other frame portions of the motor vehicle.

3. The catalytic converter locking device of claim 2 further comprising a removeable alignment structure that is configured to be temporarily disposed between the first and second bottom plates.

4. The catalytic converter locking device of claim 3 wherein the removeable alignment structure further comprises:

a planar structure that is matched in size to the first and second bottom plates at least one slot disposed within the alignment structure and having a width; and a plurality of springs that can be temporarily disposed between the first and second bottom plates.

5. The catalytic converter locking device of claim 4 wherein the alignment structure is fixed in position by the tamper-resistant fasteners and, in this fixed position, hexagonally-headed fasteners having head dimensions that match the width of the at least one slot disposed within the alignment structure to prevent the hexagonally-headed fasteners from rotating.

6. The catalytic converter locking device of claim 4 wherein springs are used in conjunction with the tamper-resistant fasteners to fix the position between the first and second bottom plates during insertion of the metal cable between the first and second bottom plates and between the hexagonally-headed fasteners, or the openings defined thereby.

* * * * *